May 8, 1951      C. B. BUDD      2,552,085

SHRINKOMETER

Filed April 25, 1946

Inventor
Chester B. Budd
By [signature]
Att'y

Patented May 8, 1951

2,552,085

UNITED STATES PATENT OFFICE 2,552,085

SHRINKOMETER

Chester B. Budd, Akron, Ohio, assignor to The B. F. Goodrich Company, New York, N. Y., a corporation of New York Application April 25, 1946, Serial No. 664,822

2 Claims. (Cl. 73—160)

This invention relates to the determination of shrinkage characteristics of filamentary articles such as reinforcing cords for tires, belts and the like.

In the processing of cords for use as reinforcement in tires it is desirable to provide cords of uniform shrinkage and shrinkage rates. Cords that have variable shrinkage characteristics, that is, variable changes in length under given moisture conditions, sometimes cause excessive breakage in the processing as where the cords are dipped in a bath of adhesive. The shrinkage characteristics of reinforcing cords used in such products as V-belts are of importance also, especially in affecting adversely the uniformity of length of the belt.

In selecting filamentary articles such as cords for use as reinforcement in tires and other products it is desirable to have testing apparatus and procedure adapted to determine conveniently the shrinkage characteristics of such articles.

Objects of the invention are to provide for determining expeditiously the shrinkage characteristics of a cord or other filamentary article, to provide for exposing the article to moisture, to provide for heating and drying the article, to provide for determining the elongation characteristics of the cord or other filamentary article, and to provide apparatus for carrying out the test with facility.

These and further objects will be apparent from the following description, reference being had to the accompanying drawings in which.

Figure 1:
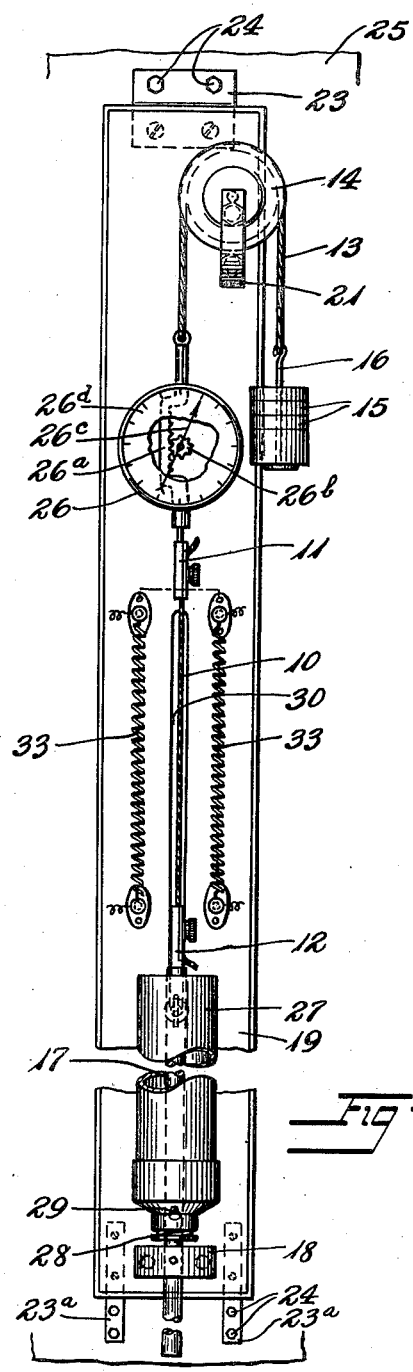
Fig. 1 is a front elevation of apparatus constructed according to and embodying the invention, parts being broken away.
Figure 2:
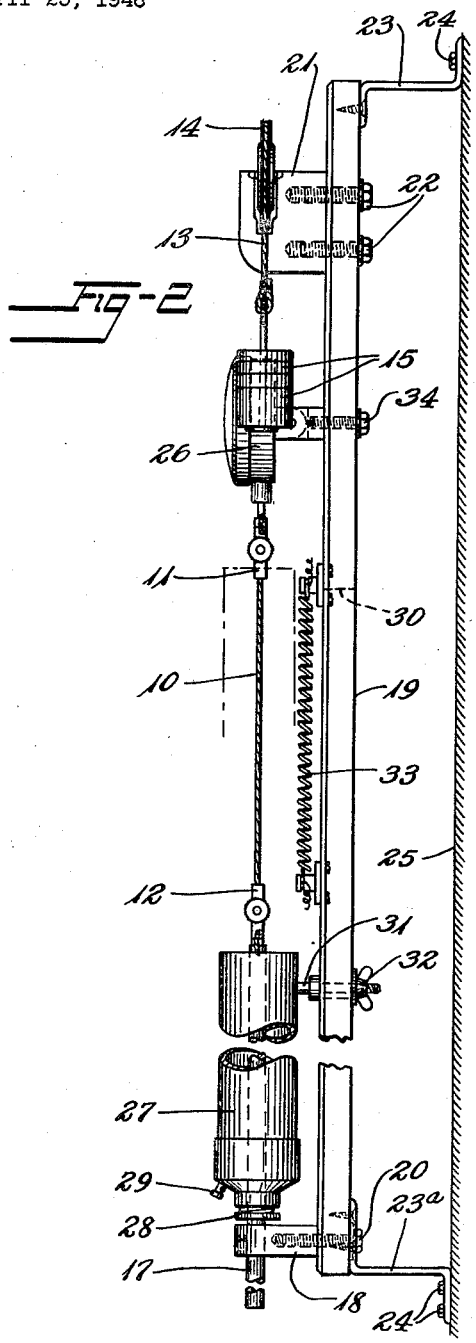
Fig. 2 is a side elevation of the apparatus shown in Fig. 1, parts being broken away.

Apparatus embodying the invention is shown in the drawings in which a filamentary article such as a cord 10 to be tested is held in a vertical position by a pair of gripping elements such as plate clamps 11 and 12. The upper clamp 11 is connected to an element of flexible strip material such as a cable 13. Said cable 13 passes over a pulley 14 and is secured to a hook 16 upon which detachable weights 15 are suspended. The weights 15 counterbalance the weight of the upper clamp 11 and parts of the measuring gage, as will be explained more fully hereinafter, and further may provide additional weight for subjecting the cord 10 to tension, if desired. The lower clamp 12 is secured to a vertical rod 17 which is mounted in a lug 18 which is attached to a vertical stand 19 by means of bolts 20. As shown in the drawing, the rod 17 is slidably movable up and down in the lug 18 and may be fixed in position by a set screw threaded in the lug. A bracket 21 is mounted on the upper part of the stand 19 by bolts 22 and supports the pulley 14. The stand 19 may be mounted on a wall 25 or other suitable surface by angle brackets 23 and 23a, and bolts 24, 24.

To measure shrinkage and elongation of the cord 10 a lineal displacement measuring means such as a springless dial gage 26 is mounted by means of a bolt 34 on the vertical stand 18. In the dial gage 26, a rack 26a is slidably mounted in the casing of the gage 26 and is connected to the upper clamp 11 and to the cable 13. The rack 26a engages a pinion 26b which is rotatably mounted in the gage 26. An indicating pointer 26c is mounted on the pinion 26b and indicates displacement of the rack 26a on a calibrated dial 26d which is mounted on the gage 26.

To immerse the cord 10 in a fluid a cylindrical container 27 is slidably mounted on the rod 17. A packing type water seal 28 at the junction of the container 27 and the rod 17 prevents the escape of fluid. A drain tube 29 is mounted on the container 27 to drain the fluid and to make possible a circulating system where the fluid may enter at the open top of the container 27 and leave at the drain tube 29. To hold the container 27 at a desired position, a support rod 31 is secured to the container 27 and clamped to the stand 19 by a wing-nut clamp 32. The clamp 32 slides in a vertical slot 30 in the stand 19 permitting the container 27 to move up and down the rod 17 and holding it at any position along the slot 30. Heating elements 33, 33 to heat the cord 10 may be mounted at each side of the slot 30 on the stand 19. The apparatus may be balanced by increasing or decreasing the weights 15 on hook 16 to counterbalance the upper clamp 11 and the rack 26a.

In use, assuming the parts to be in the positions shown in the drawings, the cord 10 to be tested may be clamped in the plate clamps, 11 and 12, and a reading taken from the dial gage 26 before wetting. The rod 17 may be moved up or down in the lug 18 to adjust the position of the lower clamp 12 so that different length cords may be tested. The container 27 may be filled with a suitable fluid such as water and the drain tube 29 plugged, or a connection made to another container of a circulating system for controlling the fluid condition, if desired. In the latter case the fluid may be directed from the other container into the open top of the container 27 and then through the drain tube 29 to the other container. When desired, the container 27 may be moved to the position shown by dotted lines in Fig. 1, to embrace the cord 10. To hold the container at a desired position the wing nut clamp 32 may be used to clamp the container 27 to the stand 19. To determine the shrinkage or elongation characteristics of the cord 10 readings of the dial gage 26 may be taken at regular intervals of time during the period when the characteristics of the cord 10 are of interest, as during the period of immersion wetting. As the cord 10 decreases or increases in length the rack 26a will move actuating the pinion 26b and rotating the pointer 26c which will indicate a change in length of the cord on the dial 26d. If it is desired that the cord be subjected to tension during the test, weights 15 may be added to the hook 16. During the immersion of the cord 10 in the fluid of the container 27 the fluid may be heated and after the container 27 is lowered the cord 10 may be heated by means of the heating elements 33, 33.

Variations may be made without departing from the scope of the invention as it is defined in the following claims.

I claim:

1. Apparatus for measuring the change in length of a filamentary strip article while immersed in a fluid, said apparatus comprising a supporting structure, a rod-like member mounted on said structure and disposed in a vertical position, a gripping element mounted at the upper end of said rod-like element, an upper gripping element disposed above said first-mentioned gripping element, a displacement-measuring means mounted on said supporting structure and connected to said upper gripping element, means for subjecting the article to tension, and means for immersing the article in a fluid, said last-mentioned means comprising a fluid container receiving said rod-like member and mounted for vertical adjustment along the same to embrace said article in the raised position and clear the article in the lowered position and having upper and lower openings in the container wall for passage of said rod-like member through both said openings, and means at the lower of said openings between said container and said rod-like member for sealing the opening in various positions of the adjustment.

2. Apparatus for measuring the shrinkage of a filamentary strip article, said apparatus comprising a pair of article-holding elements, a supporting structure, an elongated member secured to one of said elements and being mounted on said structure in a position extending away from the element and substantially along the axis of the suspended article, means connected to said supporting structure for supporting the other of said elements at a position spaced from the first-mentioned element and permitting movement of the second-mentioned element relative to the first-mentioned element, means for immersing the article in a fluid while suspended between said elements, said last-mentioned means comprising a fluid container receiving said elongated member and mounted for vertical adjustment along the same to embrace said article in the raised position and clear the article in the lowered position and having upper and lower openings in the walls of the container for passage of said elongated member through both said openings, means at the lower of said openings between said container and said elongated member for sealing the opening in various positions of the adjustment.

CHESTER B. BUDD.

REFERENCES CITED

The following references are of record in the file of this patent:

UNITED STATES PATENTS

| Number | Name | Date |
|---|---|---|
| 996,417 | Laurence et al. | June 27, 1911 |
| 1,885,209 | Koester | Nov. 1, 1932 |
| 2,121,432 | Colbeth | June 21, 1938 |
| 2,154,631 | McNally | Apr. 18, 1939 |
| 2,459,738 | Prettyman et al. | Jan. 18, 1949 |

FOREIGN PATENTS

| Number | Country | Date |
|---|---|---|
| 400,983 | Germany | Dec. 19, 1923 |
| 622,323 | Germany | Nov. 26, 1935 |